Jan. 12, 1937. P. R. OWENS Re. 20,240

HEAT CONTROLLING SYSTEM

Original Filed Jan. 15, 1926 2 Sheets-Sheet 1

Inventor
Percy R. Owens.
By his Attorneys
Ward, Crosby & Smith

Jan. 12, 1937. P. R. OWENS Re. 20,240

HEAT CONTROLLING SYSTEM

Original Filed Jan. 15, 1926 2 Sheets-Sheet 2

Inventor
Percy R. Owens.
By his Attorneys
Ward, Crosby & Smith

Reissued Jan. 12, 1937

Re. 20,240

UNITED STATES PATENT OFFICE 20,240

HEAT CONTROLLING SYSTEM

Percy R. Owens, Scarsdale, N. Y., assignor, by direct and mesne assignments, to Warren Webster & Company, Camden, N. J., a corporation of New Jersey Original No. 1,812,897, dated July 7, 1931, Serial No. 81,465, January 15, 1926. Application for reissue October 17, 1935, Serial No. 45,500

9 Claims. (Cl. 236—46)

This invention relates to heat controlling and regulating systems and more particularly to systems for regulating the quantity of heating medium flowing through conduits, such as for example the steam mains of heating plants of buildings, to provide the desired heating suitable for the time of day or as necessitated by the prevailing temperatures.

In accordance with this invention a control valve cutout member is arranged in a source of supply for controlling the heat supplying medium which may comprise any of the usual fluid mediums, such as steam, hot air, hot water, or may comprise a current flowing through an electrical conductor or conduit, or a fuel medium such as gas or oil flowing through a conduit to the heating plant. This control valve member or cutout according to the preferred example of my invention as here disclosed, is arrenged to be alternately or intermittently opened and closed, means being provided to automatically adjust or vary the frequency or length of the intervals during which the valve is open. For example, during the night time less heat is required in many buildings and in accordance with this invention means are provided for automatically reducing the quantity of heating medium flowing during any predetermined part of the day. Also, in the preferred form of the invention means are provided for thermostatically regulating the quantity of heating medium which flows, that is, the effective rate of supply, in order to provide for changes in the prevailing temperature during both normal and subnormal heating. The valve arrangement and other features described are shown by way of example and for the sake of simplicity and it will be understood that various forms of remote control valves operated by electricity, water power or other means may be used.

The invention comprises the novel features, arrangements and combination of parts embodied by way of example in the apparatus hereinafter described as illustrating a preferred form of the invention.

Various objects, further features and advantages of the invention will clearly appear from the detailed description given below taken in connection with the accompanying drawings which form a part of this specification.

In the drawings, Fig. 1 illustrates a front elevational view of one form of mechanism embodying my invention.

The operation and general arrangement of the entire mechanism will be first briefly described. Referring to the schematic diagram of Fig. 4, a conduit for the heating medium or supply is indicated at 10, a valve of any suitable type being inserted therein as shown at 11. In the system as illustrated, this valve is controlled by a pilot valve shown at 12 associated with a cylinder 13 containing a valve operating piston 14.

Figure 4:
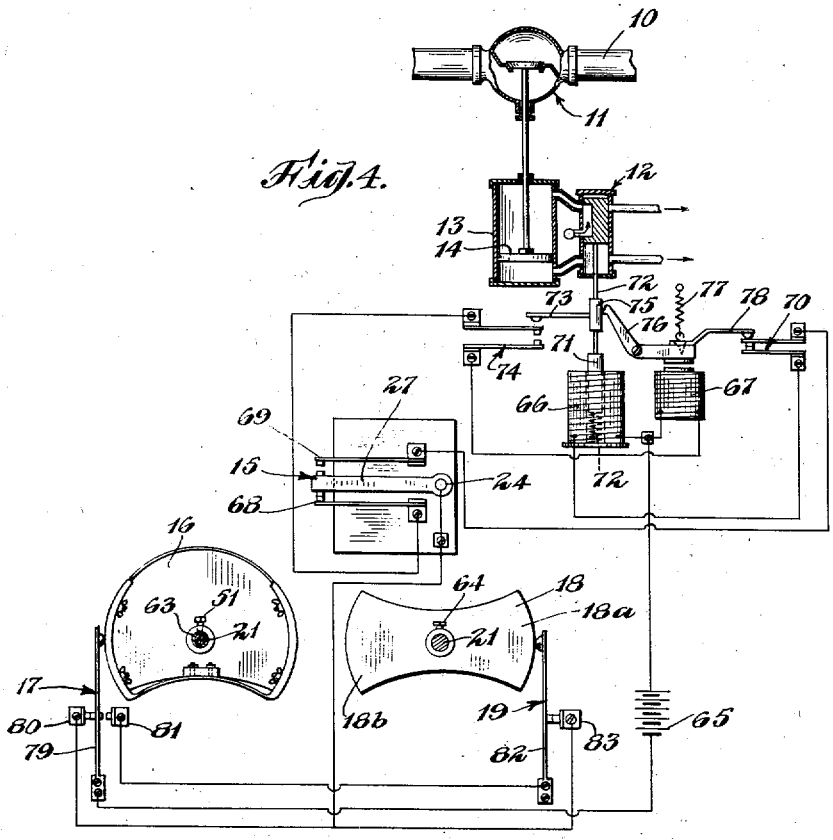
Fig. 4 is a schematic illustration showing the electrical connections for the apparatus embodying my invention and showing the invention as applied to a remote control valve operated by fluid pressure.

Mechanism hereinafter described serves to intermittently operate a contact device 15 for alternately opening and closing the valve 11 at intervals. With the apparatus here shown the valve is normally opened and closed four times during each hour. A rotatable switch controlling cam is illustrated at 16 which rotates at a speed of one revolution each 24 hours. This cam in cooperation with switching mechanism 17 serves to place in service or remove from service a control cam 18 and associated contact mechanism 19. The cam 18 is designed to be rotated at a rate of one revolution per hour and with the cam shaped as illustrated in Fig. 4 it serves to actuate switching device 19 in a manner whereby the contact making device 15 will be made effective to open the valve 11 only twice during each hour, whereas when the cam 18 is out of service the valve 11 would be alternately opened and closed four times during each hour.

Figure 1:
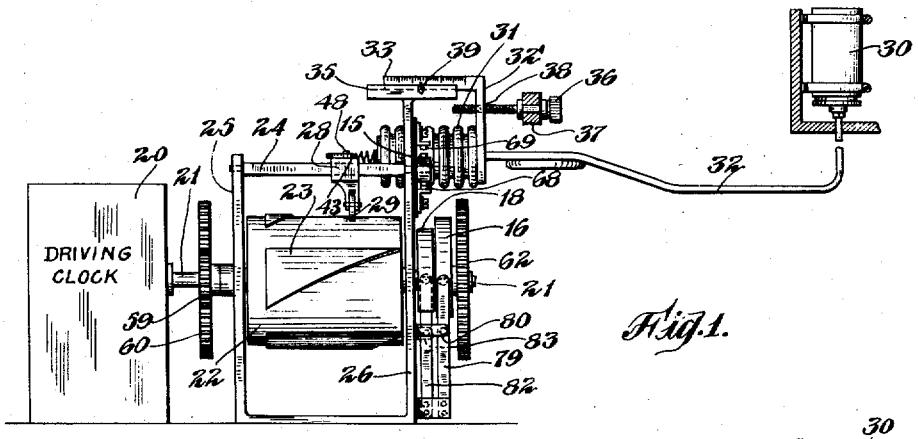
Figure 2:
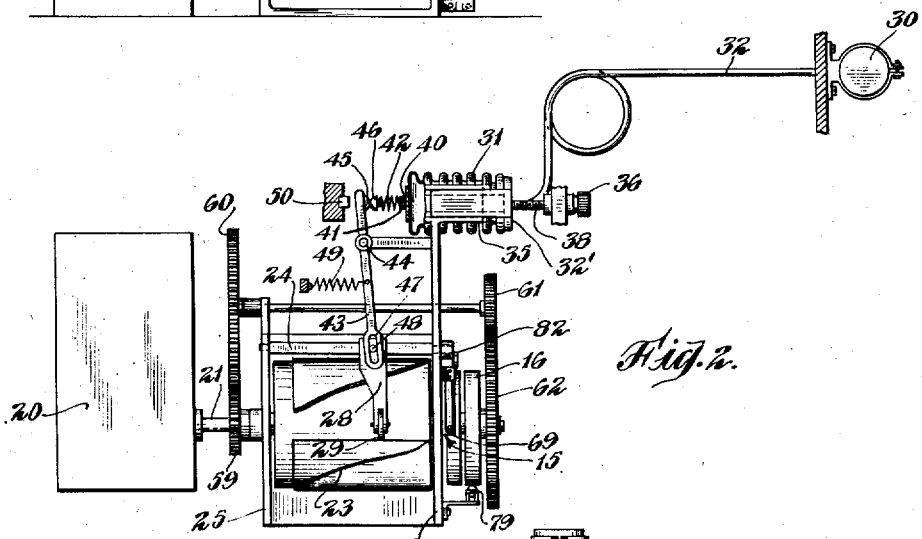
Fig. 2 is a top plan view of the same.

Referring to Fig. 1, a driving clock is indicated at 20 having a rotating drive shaft 21 upon which is mounted a cam member 22. The cam member 22 is rotated at a speed of one revolution per hour and the cam 18 above referred to may be mounted upon the same shaft 21 to rotate therewith. The cam 16, however, which rotates at the rate of one revolution each 24 hours may be driven by suitable gearing connected to the shaft 21.

The cam 22 as shown may be provided with a number of raised areas as at 23 corresponding in number to the number of times per hour that the valve 11 is to be opened and closed. In this instance the number is four. Suitable means for operating the contact device 15 by the cam 22 is provided and may comprise a shaft 24 pivotally mounted in supporting side frames 25 and 26. A switch arm 27 is secured to the shaft 24 and turns therewith. An arm 28 is provided with a contact roller 29 for engaging the surface of the cam 22. The arm 28 is slidably mounted upon the shaft 24, which shaft may be square or otherwise formed where it engages the arm 28 so that the shaft is caused to turn in accordance with movements of the arm 28. As the driving clock uniformly rotates the cam 22, the arm 28 will be alternately raised and lowered at regular intervals by reason of the engagement of the roller 29 with the raised cam portions 23. Accordingly, the switch arm 27 will be actuated at intervals.

Figure 3:
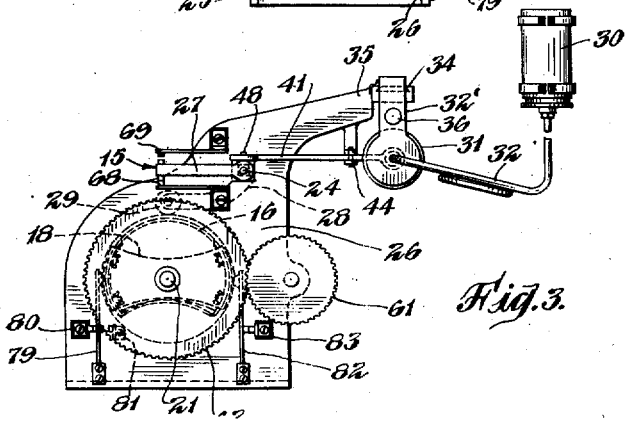
Fig. 3 is an end view.

Means will now be described for automatically adjusting the position of the arm 28 along the shaft 24 in accordance with changes of the prevailing temperature. A bulb member or other suitable container 30 is located at a desirable point, preferably out of doors, where it is subjected to the outdoor temperatures. This bulb member is communicative with an expansible chamber 31 through suitable tubing 32. The bulb and expansible chamber, together with the tubing, may be filled with a suitable known medium which is expansible and the volume of which is highly sensitive to temperature variations. One end of the expansible chamber 31 may be secured to a supporting member 32'. The supporting member 32' may be longitudinally adjustable and in the construction shown is provided with an extension at 33, having a tongue and groove engagement as at 34 (see Fig. 3), with a fixed supporting frame member 35. The longitudinal position of the support 32' in respect to the frame member 35 may be adjusted and maintained by means of a thumb screw 36 rotatably mounted within suitable supporting lug 37 and having threaded engagement at 38 with the support 32'. A suitable indicator may be provided as at 39 for indicating the position of the expansible chamber and its support in respect to the fixed base. The tubing 32 may be formed of flexible material with suitable coiled portions as shown to permit the position of the expansible chamber to be freely adjusted.

At the end of the expansible chamber opposite from the support 32' a suitable end plate member 40 may be fixed as by solder. This end plate member may be provided with a central recess 41 for receiving a spiral spring 42 which is fixed therein. A lever is shown at 43 pivoted at 44 to a part of the frame and provided with a suitable mechanical contact button 45 engaging a corresponding button 46 mounted at the outer end of the spring 42. The contact buttons should be so shaped as to permit the lever 43 to be turned about its pivot when the expansible chamber 31 becomes elongated, the engagement of the contact buttons being such that frictional resistance is substantially eliminated. The lever 43 at its end opposite from the contact button 45 may be slotted as at 47 for receiving a pin 48 mounted on the arm 28. This pin and slot connection permits the arm 28 to be moved longitudinally of the cam 22 whenever the lever 43 is moved. The movements of the lever 43 in turn are controlled by the prevailing temperature which causes the expansible chamber 31 to expand or contract. Upon an increase in temperature the consequent expansion of the chamber causes the lever 43 to turn in a counter-clockwise direction, whereas a decrease in temperature permits a retracting spring 49, which is attached to the lever, to draw the lever around in a clockwise direction. It will be noted that when the lever 43 is turned in a clockwise direction, the arm 28 is moved to the left as viewed in Fig. 1. It will also be noted that the raised portions 23 upon the cam member 22 vary in width from substantially a point at the right hand end of the cam, to the large areas covering the major part of the surface of the cam at its left hand end. When the lever 43 is moved in response to decreases in temperature in a clockwise direction, the arm 28 will move the contact wheel 29 over toward the left hand end of the cam 22. This will cause engagement with the large raised areas of the cam and cause the contact device 27 to effect an opening of the valve 11 for a longer interval of time, thereby admitting the heating medium to the heating system for a larger percentage of time and thus in greater quantities. Conversely, upon an increase in temperature and a counter-clockwise movement of the lever 43, contact will be made with the narrower parts of the raised portions 23, which will cause the valve 11 to be opened only for intervals amounting to small fractions of the total elapsed time. This reduces the supply of heating medium. A suitable stop member is shown at 50 for limiting the counter-clockwise turning movement of the lever 43.

Figure 5:
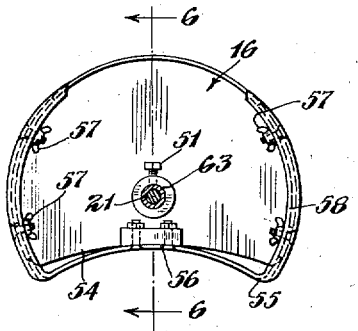
Figs. 5 and 6 illustrate details of one form of a control cam member which may be embodied in my invention.
Figure 6:
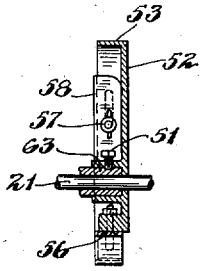

Further details relating to the control cams 16 and 18 and the control circuit of Fig. 4 will now be described. The cam 16 may be fixed upon a hollow shaft (hereinafter again referred to) as by a set screw 51, which permits the angular position of the cam to be adjusted a predetermined amount to fix the time of day during which subnormal heating is to be provided. Further control of this particular time of day during which subnormal heating may be desired is made possible by constructing the cam 16 as illustrated in Figs. 5 and 6. This cam may comprise a plate member 52 formed with a peripheral flange 53 extending around the portion of the periphery of the cam corresponding to the portion of the day during which normal heating is required. This flange and the adjacent portion of the plate 52 are cut away as at 54 to provide a cam area corresponding to the part of the day or 24 hours during which only subnormal heating is required. The respective times at which this period of subnormal heating begins and ends may both be adjusted by the use of a spring flange member 55 which is fixed at 56 midway at its ends to the cam plate and having arms extending from this fixed point to provide adjustable extensions to each end of the flange 53. These extension arms are made fast to the flange 53 by suitable thumb screws 57 which engage arcuate portions 58 of the spring arms. To advance or retard the time at which subnormal heating is initiated or restored, it is merely necessary to losen the appropriate thumb screws 57 and adjust the position of the corresponding spring arm of the member 55 which in effect elongates or contracts the flange 53.

The cam member 16 as above stated is arranged to turn through one complete revolution every 24 hours. To accomplish this result, a suitable gear train 59, 60, 61 and 62 driven by the driving clock may be provided. The gear 62 may be fixed to a hollow shaft 63 (see Figs. 4 and 5), which is also engaged by the set screw 51 for fixing the cam 16 thereon.

The cam member 18 as above stated rotates through one revolution per hour with the shaft 21. A set screw 64 is provided for fixing the cam to the shaft so that the angular position of the cam may be adjusted if desired. The peripheral shape of this cam is such that the switch device 19 is held closed during one or more periods each hour, and the length of each period or frequency of periods of subnormal heating may be determined by the shape of this cam. If desired, this cam may be replaced by other cams of different shapes in case the subnormal heating is to be increased or decreased for any particular installation. In the form shown, two areas 18a and 18b are provided which cooperate with the switch device 19 for opening the valve 11 twice during each hour. The intervening two periods of heating which would be otherwise provided by the cam 22 are thus eliminated and subnormal heating is only effected during alternate periods of actuation of the switch 15.

A source of current is provided at 65 for operating pilot valve controlling solenoids 66 and 67. When the valve 11 is closed, the switch arm 27 is normally in position to make contact with contact portion 68. However, when the arm 28 is raised by the action of the raised portions 23 on the cam 22, then the switch arm 27 is also raised, causing the circuit through contact 68 to be broken and a new circuit to be closed through contact 69. This circuit includes a contact device 70, solenoid 66, source of current 65 and the switching device 17 and also the switching device 19 in case subnormal heating is in effect. Current flowing through this circuit energizes the solenoid 66 causing its armature 71 to be drawn inwardly against the action of a compression spring 72. The armature 71 is mechanically connected to the pilot valve 12 so that the pilot valve is thereupon actuated and in the position shown is drawn downwardly. As a consequence, the piston 14 as acted upon by fluid pressure in the customary manner is forced upwardly for opening the valve 11. The pilot valve and its armature 71 may be connected as by a rod 72 to which is attached switch operating arm 73 for actuating a circuit closing device 74. The rod 72 is also formed with an enlarged portion 75 for receiving and engaging a locking dog 76 operated by the control magnet 67. As the armature 71 approaches its extreme lower position, the arm 73 will close the contact device 74 which is in series with the control solenoid 67, but meanwhile the locking dog 76 will be drawn by a spring 77 in a position for hooking over the enlarged portion 75 for locking and securing the armature 71 in its downward position with the spring 72 under compression. At the same time a switch operating arm 78 fixed upon the locking dog will release the contact making device 70 permitting the same to open its circuit. The solenoid 66 is thereupon deenergized and remains so until the next cycle of operation. The valve 11 will remain in its open position until the contact arm 27 is again allowed to drop into contact with contact 68. Thereupon a circuit is completed through contact device 74 which has already become closed and the solenoid 67 is actuated by current from the source 65. The solenoid 67 will thus be energized causing the release of the locking dog 76 and permitting the spring 72 to raise the armature 71 and pilot valve for closing the main valve 11. At the same time the circuit through the contact device 70 will be restored by the switch actuating arm 78 and will be kept closed since the locking dog 76 engages the side of the enlargement 75 and hence the spring 77 is ineffective to raise the arm 78. The apparatus is now in condition for the cycle of operation to be repeated when the next raised portion 23 on the cam 22 comes into active position.

During normal heating, the contact making device 17 which comprises a spring contact arm 79 will be in a position to close the circuit through contact 80. This switch is held in this closed position so long as the switch arm is in contact with the periphery 53 of the cam 16. However, during the night time or other times when only subnormal heating is necessary the cam will come into a position with its cut away portion adjacent the switch arm and at such times the resilience of the switch arm will bring the same into contact with a contact 81. Thereupon the circuit through contact 80 will be broken and a substitute circuit will be closed through the contact 81 to the switch device 19. The device 19 may comprise a spring switch arm 82 for cooperation with a fixed contact 83. When the switch arm 82 is in engagement with the cam 18, the circuit will be closed through the contact 83 and the effect will be the same as during normal heating. However, during a predetermined portion of each hour of subnormal heating as above stated, the cam 18 will be in such positions that its cut away portions will permit the switch arm 82 to break contact with the contact 83. At such times, the circuit will be opened and although the switching device 15 may operate, it will be ineffective to then control the valve 11.

It will thus be seen that a system for automatic heat regulation is provided which in this particular example comprises intermittently and alternately shutting off and admitting the supply in such a manner as to provide for both normal and subnormal heating and permitting greater or less heating as may be made necessary by changes in the prevailing outdoor temperatures. The thermostatic regulation of the mechanism may be adjusted by turning the thumb nut 36. This adjustment should be made in accordance with the temperature which is desired to be maintained by the heating plant. The adjustment may first be made by trial and thereafter permanent temperature graduations may be made adjacent the indicator 29.

It will be understood that the conjoint thermostatic and time controlled features of the invention are adaptable to a variety of uses and arrangements and that according to certain phases of the invention the quantity of heat supplied may be thermostatically regulated otherwise than by the use of intermittent "on" and "off" periods.

It is not desired to limit the invention to the details and example herein described, since it will be obvious to those skilled in the art after understanding the invention, that various modifications and substitutions may be made without departing from the scope of the invention and I aim, therefore, in the appended claims to cover all such modifications.

What I claim as new and desired to secure by Letters Patent is:

1. In combination, a conduit for a heating medium, valve means controlling the quantity of heating medium flowing therethrough by automatically checking and releasing the flow at intervals, and clock operated mechanism acting to render said valve means ineffective to release the flow at alternate intervals during parts of the day when reduced heating is desired.

2. Heat regulating means comprising a valve arranged for remote control, an electric control circuit therefor having a clock driven circuit breaker for effecting intermittent opening and closing movement of said valve, and mechanism operated by the same clock for reducing the frequency of intervals of operation during a predetermined portion of the day.

3. In combination, a conduit for conducting a heating medium, a valve in said conduit, remote control means for said valve including an electrical circuit, circuit breaking means for automatically opening and closing said circuit at intervals to cause operation of said valve with a consequent checking or release of the fluid medium, a switch for maintaining said circuit in open condition during a portion of the intervals when said circuit breaker is closed, and a motor operated additional switching means for rendering said switch ineffective during predetermined portions of each day.

4. In combination, a conduit for conducting a heating medium, a valve in said conduit, remote control means for said valve including an electrical circuit, circuit breaking means for automatically opening and closing said circuit at intervals to cause operation of said valve with a consequent checking or release of the fluid medium, a switch operating according to an hourly cycle for reducing the number of intervals per hour during which said circuit would otherwise be closed, and additional switching means operating according to a predetermined longer cycle for throwing said first switch out of circuit when normal heating is desired and into circuit for subnormal heating.

5. In combination, a conduit for conducting a heating medium, a valve in said conduit, remote control means for said valve including an electrical circuit, circuit breaking means for automatically opening and closing said circuit at relatively short intervals to cause operation of said valve with a consequent checking or release of the fluid medium, and switching means operating at numerous longer intervals each day according to a variable but predetermined cycle for maintaining said circuit open during a portion of said relatively short intervals when said circuit would otherwise be closed, to provide for a reduced heat supply during desired periods according to a cycle which is at least one day in length.

6. In combination, a conduit for conducting a heating medium, a valve in said conduit, remote control means for said valve including an electrical circuit, a plurality of cams each actuating switching mechanism in said circuit, one of said cams effecting opening and closing of said circuit at intervals of thermostatically regulated length to cause operation of said valve and consequent regulation of the flow of heating medium, one of said cams operating a switch for reducing the number of intervals during which said circuit would otherwise be closed, and one of said cams operating according to a predetermined daily cycle for throwing said last named switch out of circuit when normal heating is desired.

7. In combination, a conduit for conducting a heating medium, a valve in said conduit, remote control means for said valve including an electrical circuit, electromagnetic means in said circuit for effecting opening of said valve against the action of a spring, an auxiliary circuit with electromagnetic means for locking the valve open, and circuit breaking means for alternately opening and closing respectively said circuit and auxiliary circuit at regulated intervals to cause operation of said valve with a consequent checking or release of the fluid medium at corresponding intervals.

8. In combination, a conduit for conducting a heating medium, a valve in said conduit, remote control means for said valve including an electrical circuit, electromagnetic means in said circuit for effecting opening of said valve against the action of a spring, an auxiliary circuit with electromagnetic means for locking the valve open, circuit breaking means for alternately opening and closing respectively said circuit and auxiliary circuit at regulated intervals to cause operation of said valve with a consequent checking or release of the fluid medium at corresponding intervals, and means for automatically reducing the number of periods during which the fluid medium is released when subnormal heating is desired.

9. In combination, a conduit for conducting a heating medium, a valve in said conduit, a control circuit for said valve, a plurality of motor operated switching devices for said circuit, a thermostatic switch controlling means, one of said devices being operatively connected with said controlling means and affecting said circuit at intervals of thermostatically regulated length to cause intermittent operation of said valve and consequent regulation of the flow of heating medium, one of said devices affecting said circuit to reduce the number of said intervals, and another of said devices acting to throw said last mentioned device into and out of operation.

PERCY R. OWENS.